(12) United States Patent
Kitazawa

(10) Patent No.: US 6,454,419 B2
(45) Date of Patent: Sep. 24, 2002

(54) INDICATED POSITION DETECTION BY MULTIPLE RESOLUTION IMAGE ANALYSIS

(75) Inventor: Takayuki Kitazawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/810,619

(22) Filed: Mar. 19, 2001

(30) Foreign Application Priority Data

Mar. 24, 2000 (JP) ........................................ 2000-084101

(51) Int. Cl.⁷ .................. G03B 21/26; G03B 21/00; G03B 19/16; G03B 9/08
(52) U.S. Cl. ..................... 353/122; 353/28; 353/30; 353/42; 434/44
(58) Field of Search ............................ 353/30, 42, 122; 353/28; 434/43, 44

(56) References Cited

U.S. PATENT DOCUMENTS

| | | | | |
|---|---|---|---|---|
| 6,050,690 A | * | 4/2000 | Shaffer et al. | 353/122 |
| 6,260,973 B1 | * | 7/2001 | Minato et al. | 353/42 |
| 6,346,933 B1 | * | 2/2002 | Lin | 345/157 |
| 6,382,798 B1 | * | 5/2002 | Habraken | 353/122 |

* cited by examiner

Primary Examiner—Russell Adams
Assistant Examiner—Magda Cruz
(74) Attorney, Agent, or Firm—Oliff & Berridge, PLC

(57) ABSTRACT

An image of the display screen including an indicated position is captured, and a low resolution image is produced from the captured high resolution image. A low resolution pixel corresponding to the indicated position is found within the low resolution image, and the indicated position is then found within the captured image based on a unit area that is associated with the low resolution pixel corresponding to the indicated position. A resolution of the low resolution image is determined by finding integers A and B so that a value f given by $$f = \frac{X \times Y}{A \times B} + A \times B$$

is at a minimum, where X denotes a number of high resolution pixels of the captured image in a horizontal direction, Y denotes a number of high resolution pixels of the captured image in a vertical direction, and A denotes a number of high resolution pixels of the unit area in the horizontal direction, and B denotes a number of high resolution pixels of the unit area in the vertical direction. A and B are divisors of X and Y, respectively.

12 Claims, 14 Drawing Sheets

High resolution image

Low resolution image

Fig. 13

| Captured High Resolution Image | | | Low Resolution Image | | | | | |
|---|---|---|---|---|---|---|---|---|
| Horizontal resolution X | Vertical resolution Y | $R_{opt}$ | A | B | A×B | $\|R_{opt} - A \times B\|$ | Horizontal resolution X/A | Vertical resolution Y/B |
| 1024 | 768 | 886.8 | 32 | 24 | 768 | 118.8 | 32 | 32 |
| 800 | 600 | 692.8 | 25 | 25 | 625 | 67.8 | 32 | 24 |
| 640 | 480 | 554.2 | 20 | 24 | 480 | 74.2 | 32 | 20 |
| 320 | 240 | 277.1 | 16 | 16 | 256 | 21.1 | 20 | 20 |

Fig. 15

| Captured High Resolution Image | | | Low Resolution Image | | |
|---|---|---|---|---|---|
| Horizontal resolution X | Vertical resolution Y | $R_{opt}$ | A | Horizontal resolution X/A | Vertical resolution Y/B |
| 1024 | 768 | 29.8 | 32 | 32 | 24 |
| 800 | 600 | 26.3 | 25 | 32 | 24 |
| 640 | 480 | 23.5 | 20 | 32 | 24 |
| 320 | 240 | 16.6 | 16 | 20 | 15 |

INDICATED POSITION DETECTION BY MULTIPLE RESOLUTION IMAGE ANALYSIS

BACKGROUND OF THE INVENTION

1. Field of the Invention

The present invention relates to detection of an indicated position on a display screen that is indicated by a user.

2. Description of the Related Art

In a presentation using a projector for displaying an image supplied from a computer, the presenter often uses a pointing rod or his own finger to indicate a position on the displayed image on a screen. However, if the presenter wants to cause the computer or the projector to perform some processing using the indicated position, such as putting a mouse pointer on the indicated position, he must use a pointing device, such as a mouse, to make the change. It will be convenient for the presenter if the indicated position on the image is automatically detected by the presentation system.

SUMMARY OF THE INVENTION

An object of the present invention is to detect an indicated position on a display screen that is indicated by a presenter.

In order to attain at least part of the above and related objects of the present invention, there is provided a method of detecting an indicated position on a display screen that is indicated by a user. The method comprises the steps of: (a) capturing an image of the display screen that includes the indicated position, the captured image including a plurality of high resolution pixels; (b) producing a low resolution image with lower resolution than the captured image based on the captured image, the low resolution image including a plurality of low resolution pixels, each low resolution pixel being associated with a unit area within the captured image, the unit area including a predetermined number of high resolution pixels; (c) finding a low resolution pixel corresponding to the indicated position within the low resolution image; and (d) finding the indicated position within the captured image based on a unit area that is associated with the low resolution pixel corresponding to the indicated position. A resolution of the low resolution image is determined by finding integers A and B so that a value f given by Equation (1) is at a minimum:

$$f = \frac{X \times Y}{A \times B} + A \times B \tag{1}$$

where X denotes a number of high resolution pixels of the captured image in a horizontal direction, Y denotes a number of high resolution pixels of the captured image in a vertical direction, and A denotes a number of high resolution pixels of the unit area in the horizontal direction, A being a divisor of X, and B denotes a number of high resolution pixels of the unit area in the vertical direction, B being a divisor of Y.

When finding an indicated position within the low resolution image, in the worst case, it may be necessary to check all of the X/A×Y/B pixels within the low resolution image. Similarly, when finding the pixel that correspond to the indicated position in a unit area of A×B pixels within the captured high resolution image, it may be necessary to check all of the A×B pixels. The above Equation (1) expresses the worst case value f of the number of pixels to be checked when assuming this kind of worst case scenario.

According to the present invention, the resolution of the low resolution image is determined so that the worst case reference pixel count f will be at a minimum, so it is possible to find the indicated position faster than in the case where the indicated position on a display screen is detected based only on a captured high resolution image.

In a preferred embodiment, the resolution of the low resolution image is determined by finding the integers A and B from among combinations of integers Ai and Bj satisfying Equation (2):

$$0.5 \leq \frac{A_i}{B_j} \leq 1.5 \tag{2}$$

where Ai are divisors of X and Bj are divisors of Y.

In another embodiment, the resolution of the low resolution image is determined by finding the integers A and B from among combinations of integers Ai and Bj satisfying Equation (3):

$$\frac{Y}{X} \leq \frac{A_i}{B_j} \leq \frac{X}{Y} \tag{3}$$

where Ai are divisors of X and Bj are divisors of Y.

The resolution of the low resolution image may be determined by finding the integers A and B from among combinations of integers Ai and Bj which are equal to each other where Ai are divisors of X and Bj are divisors of Y.

The present invention can be realized in various embodiments as follows:

(1) A method and an apparatus for determining a resolution of a low resolution image;

(2) A method and an apparatus for detecting an indicated position;

(3) A display method a display apparatus utilizing the indicated position detection method or apparatus;

(4) A computer program for causing a computer to implement the functions of these methods and apparatus; and (5) A storage medium that stores the computer program.

These and other objects, features, aspects, and advantages of the present invention will become more apparent from the following detailed description of the preferred embodiments with the accompanying drawings.

BRIEF DESCRIPTION OF THE DRAWINGS

FIG. 13 shows an example of the resolution of the low resolution image determined according to the process of FIG. 11.

FIG. 15 shows an example of the resolution of the low resolution image determined according to the process of FIG. 14.

DESCRIPTION OF THE PREFERRED EMBODIMENT

Figure 1:
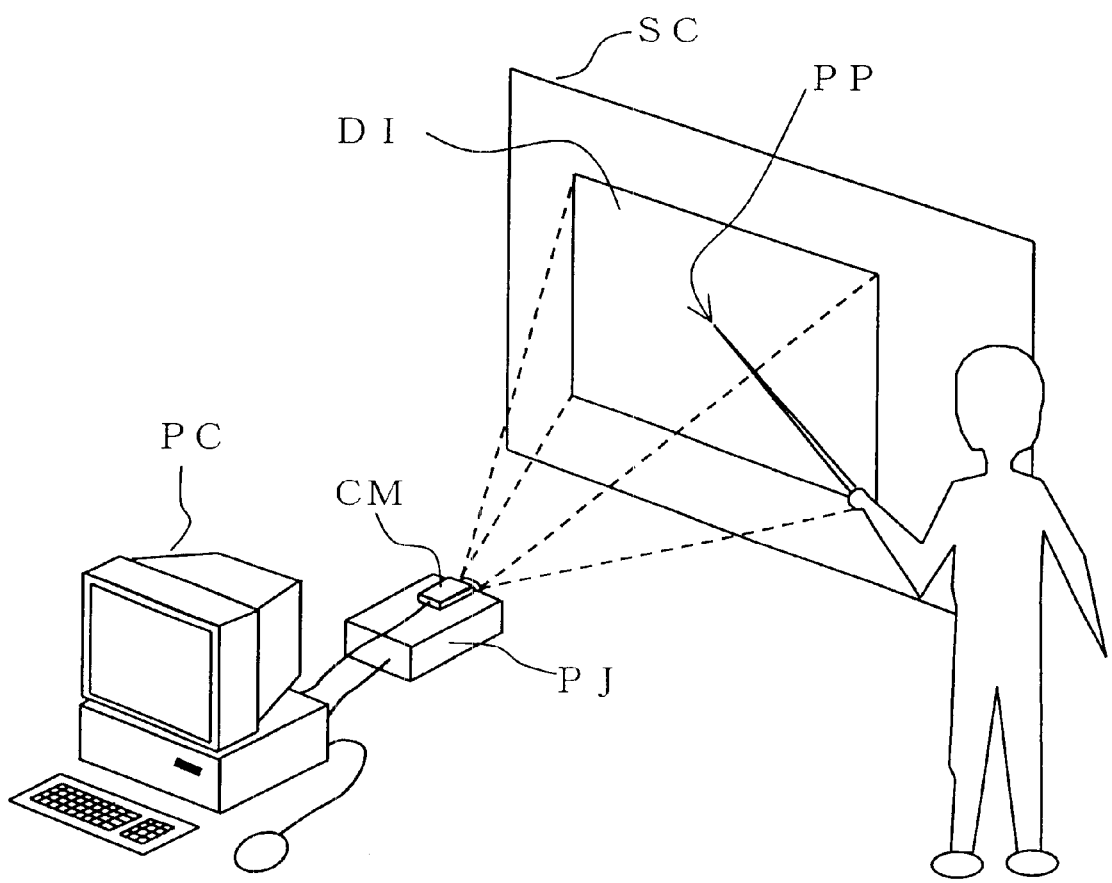
FIG. 1 shows an image display system as an embodiment of the present invention.

A. Device Structure:

FIG. 1 is an explanatory diagram that shows an image display system as an embodiment of the present invention. This image display system comprises a projector PJ, a computer PC, and a camera CM. The computer PC functions as an image signal supply device and as the indicated position detection device of the present invention. The projector PJ gives a projected display of images on a screen SC based on image signals supplied from the computer PC. The presenter gives an explanation while making indications on the screen using an index tool, such as a pointing rod or his own finger, on the screen SC. The camera CM captures the overall display screen and the images indicated by the presenter, and supplies these to the computer PC. The computer PC detects a tip position PP, or indicated position, of the index tool on the captured image, and determines coordinates of the indicated position PP on the image represented by the image signals which are supplied from the computer PC to the projector PJ. The coordinate information of the indicated position PP may be used for various processes within the computer PC. For example, a mouse pointer may be displayed on the indicated position PP on the display screen.

Figure 2:
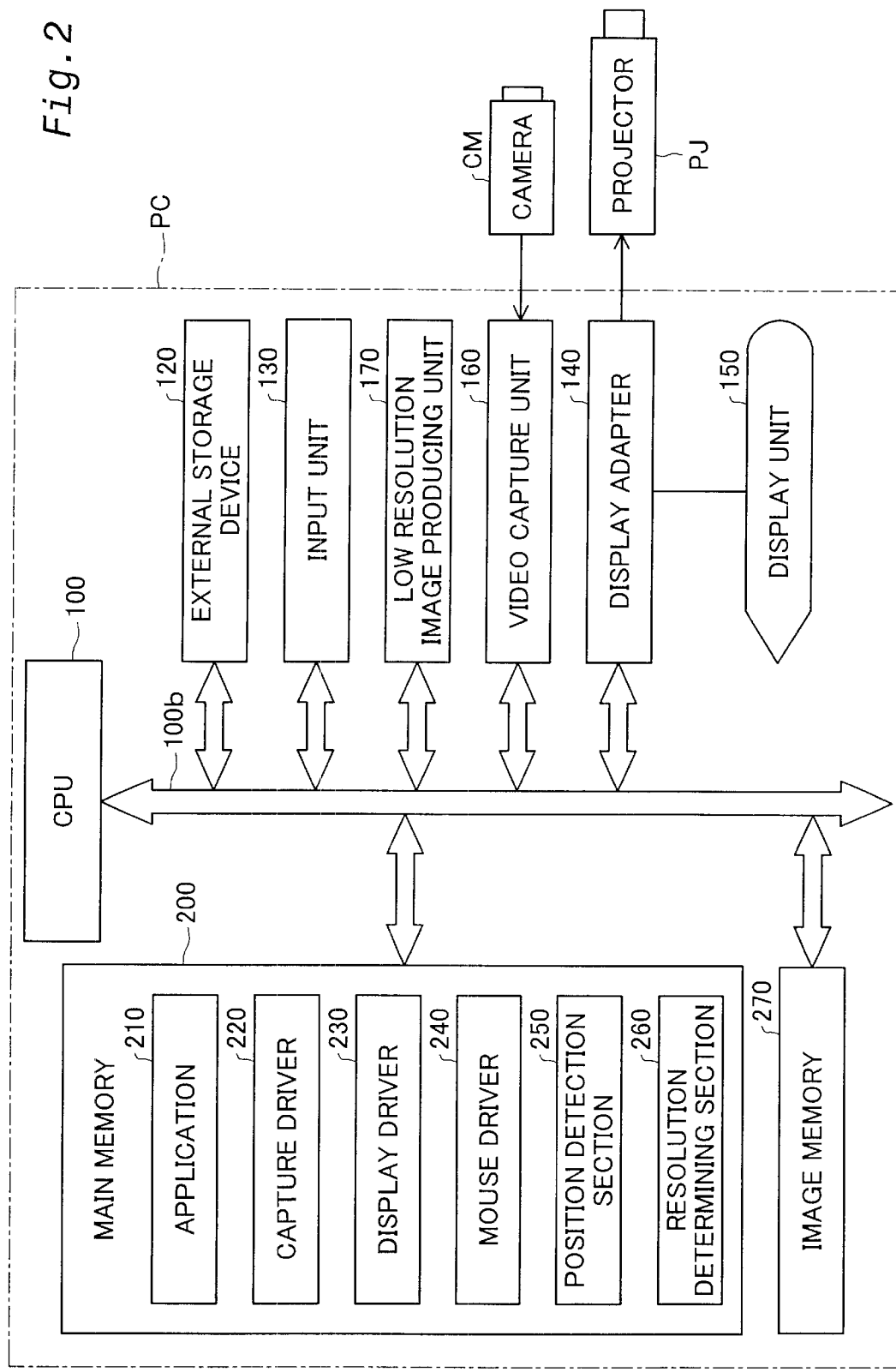
FIG. 2 is a block diagram showing the internal structure of the computer PC.

FIG. 2 is a block diagram showing the internal structure of the computer PC. The computer PC comprises CPU 100, external storage device 120 such as a hard disk device or floppy disk device, an input unit 130 such as a keyboard and mouse, display adapter 140, display unit 150, video capture unit 160, low resolution image producing unit 170, main memory 200 that includes ROM and RAM, and image memory 270. CPU 100 and each unit 120, 130, 140, 160, 170, 200, and 270 are connected to each other by a bus 100b. In FIG. 2, the various interface circuits are omitted.

Stored in the main memory 200 are various computer programs including an application program 210, capture driver 220, display driver 230, mouse driver 240, and computer programs implementing the functions of a position detection section 250 and resolution determining section 260.

The display driver 230 supplies image signals representing a display screen image to the display unit 150 and to the projector PJ via the display adapter 140. The capture driver 220 receives image data which are captured by the camera CM and supplied via the video capture unit 160, and stores the captured image data in the image memory 270. The captured image data will be also referred to as "high resolution image data" in this specification. Note that the capture driver 220 and the video capture unit 160 constitute the image capture section of the present invention.

The resolution determining section 260 determines a resolution of a low resolution image to be produced by the low resolution image producing unit 170 based on the captured high resolution image data.

The position detection section 250 causes the low resolution image producing unit 170 to produce low resolution image data based on the high resolution image data and to store the produced low resolution image data in image memory 270. The position detection section 250 then detects the indicated position PP based on the high resolution image data and low resolution image data stored in the image memory 270.

The mouse driver 240 causes the display driver 230 to draw a mouse pointer at the indicated position PP on the display screen.

The application program 210 and the computer programs that implement the functions of the capture driver 220, display driver 230, mouse driver 240, position detection section 250, and resolution determining section 260 may be provided in a form stored on a computer readable storage medium such as a floppy disk or a CD-ROM. The computer reads the computer program from that storage medium and transfers it to an internal storage device or an external storage device. Or, it is also acceptable to supply the computer programs to the computer via a network communication line. When implementing the computer program function, the computer program stored in the internal storage device is executed by the computer's microprocessor, or CPU. It is also acceptable to have the computer read the computer program stored on the storage medium and execute it directly.

In this specification, the computer is a concept that includes a hardware device and an operating system, and means a hardware device that operates under the control of the operating system. Also, when an operating system is unnecessary and the hardware device operates with the application program alone, the hardware device itself constitutes the computer. The hardware device includes at least a microprocessor such as a CPU and a means of reading the computer program stored in the storage medium. The computer program includes a program code that implements the functions of each unit or section described above on this kind of computer. Also, a portion of the functions described above can be realized by the operating system rather than an application program.

For the "storage medium" of this invention, various computer readable media can be used such as a floppy disk or CD-ROM, optical magnetic disk, IC card, ROM cartridge, punch cards, printed mater with a code such as a bar code printed on it, the computer's internal storage device (memory such as RAM or ROM) and external storage device.

Figure 3:
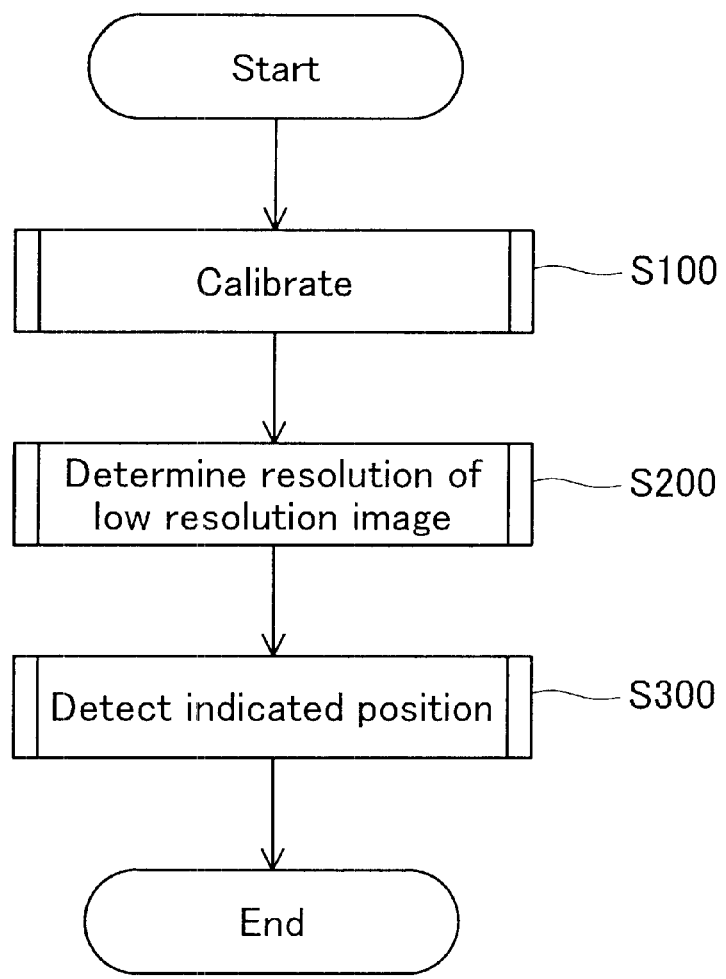
FIG. 3 is a flow chart showing a procedure of detecting an indicated position.

B. Indicated Position Detection Process:

FIG. 3 is a flow chart that shows a procedure for detecting indicated positions. First, at step S100, the position detection section 250 calibrates various condition values for detecting an indicated position. For example, it calculates the positional relationship between the captured image and the display screen, a threshold value information for extracting an index tool image from the captured image, and a threshold value information for producing a low resolution image. Next, at step S200, the resolution determining section 260 determines a suitable resolution for the low resolution image according to the resolution of the captured image that is captured by the capture driver 220 via the video capture unit 160 (FIG. 2). The determination of the resolution for the low resolution image will be described later. Then, in step S300, the position detection section 250 executes detection of the indicated position. The position detection is repeated until completion of the detection processing is instructed.

Figure 4:
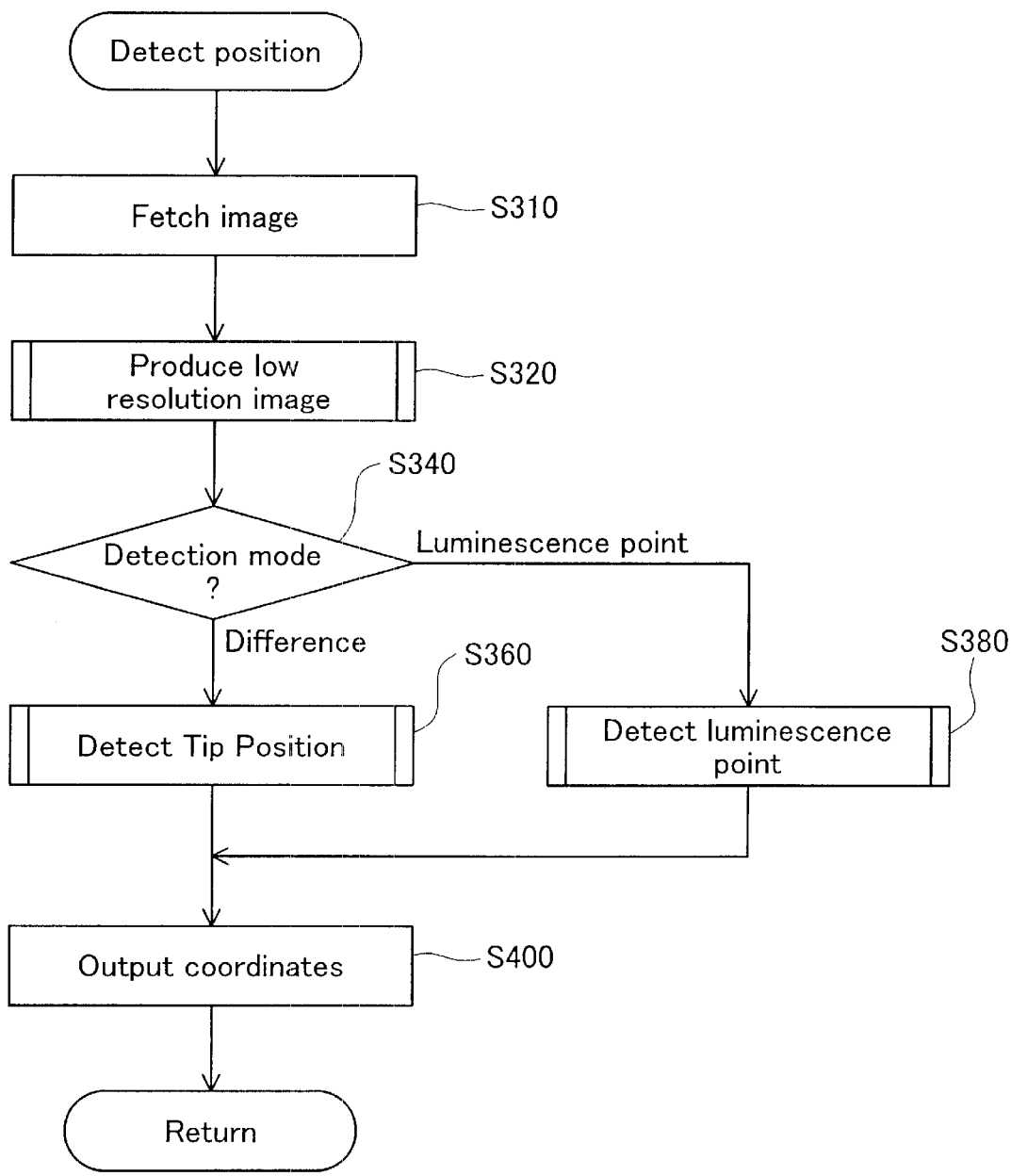
FIG. 4 is a flow chart showing the process of detecting a position at step S300 in FIG. 3.

FIG. 4 is a detailed flow chart of the position detection at step S300. At step S310, the image data captured by the camera CM (FIG. 2) is received by the video capture unit 160. The captured image data is stored in the image memory 270 (FIG. 2).

The index tool used by the presenter may be a light emitting type pointer like a laser pointer, or may be a non-light emitting type pointer such as a fescue or his own finger. In the latter case, it is preferable that the projection system includes an infrared light source (not shown) and that an infrared filter is mounted in front of the lens of the camera CM. The camera CM captures an infrared image while the infrared light source projects infrared light on the screen SC (FIG. 1). The captured infrared image does not contain the display screen image, but contains the index tool image.

Next, at step S320, a low resolution image having the resolution determined at step S200 of FIG. 3 is produced by the low resolution production unit 170 (FIG. 2) based on the captured image. The image data of the low resolution image is stored in image memory 270. The low resolution production unit 170 is constructed as a hardware unit. It is also possible to realize the low resolution production unit 170 by a computer program. The hardware implementation is preferable because of the high processing speed.

Figure 5:
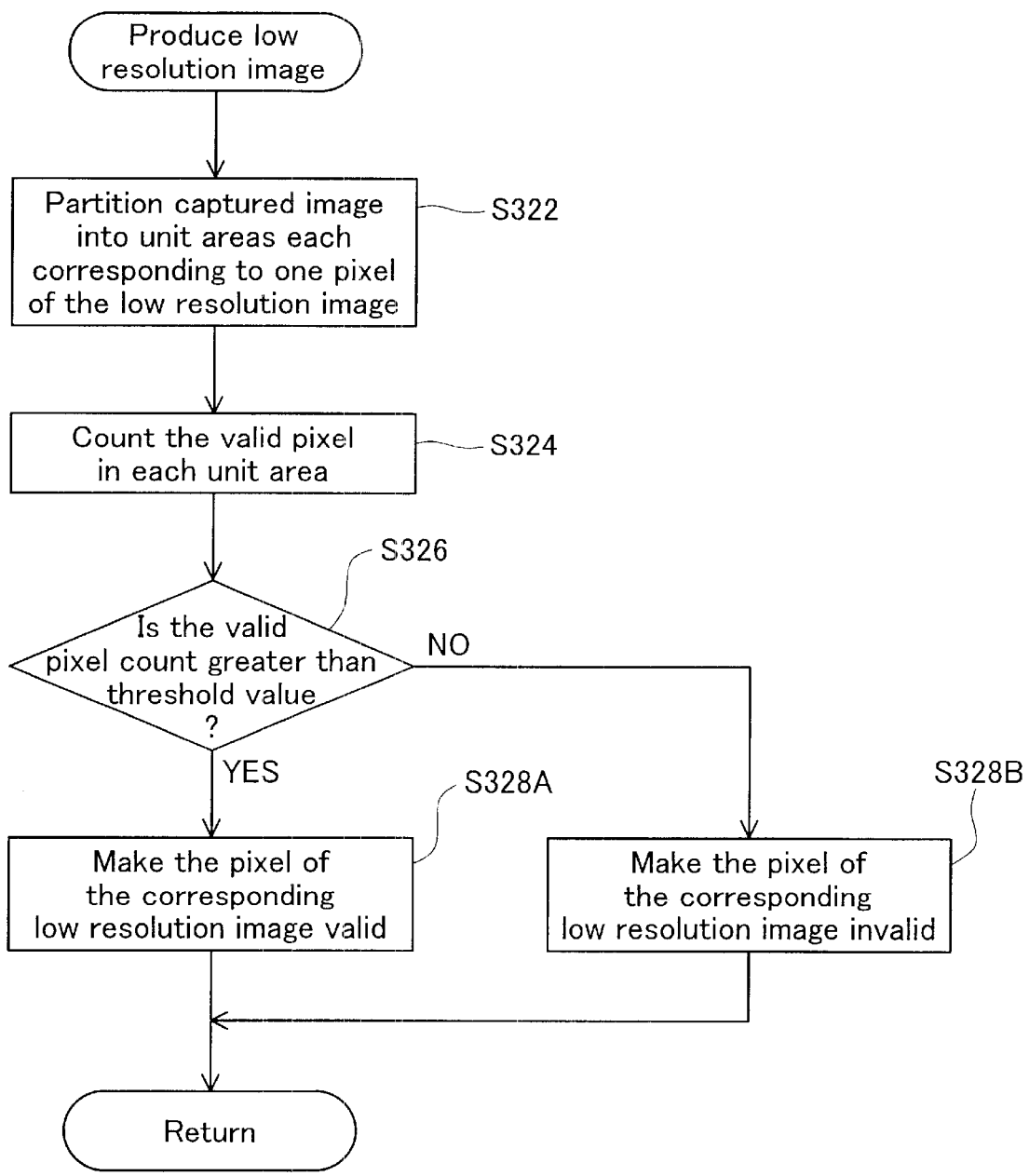
FIG. 5 is a flow chart showing an example of the process for producing a low resolution image at step S320 in FIG. 4.

Production of a low resolution image can be done using various common resolution conversion processes. FIG. 5 is a flow chart showing an example of the processes for low resolution image production at step S320 in FIG. 4. At step S322, the captured image is partitioned into unit areas each of which includes plural pixels and is associated with one pixel of the low resolution image. Next, at step S324, the number of valid pixels is counted for each unit area. The "valid pixel" denotes a pixel that has brightness greater than a predetermined brightness threshold value. At step S326, a judgment is made of whether the valid pixel count within each unit area is greater than a predetermined valid-pixel-count threshold value. When the valid pixel count is greater than the threshold value, the pixel of the low resolution image corresponding to the unit area is made valid, or "ON", at step S328A When the valid pixel count is lower than the threshold value, the pixel of the low resolution image corresponding to the unit area is made invalid, or "OFF", at step S328B. In this way, a low resolution image is produced from the captured image. The brightness threshold value and valid pixel threshold value are established by the calibration at step S100 in FIG. 1.

Figure 6A:
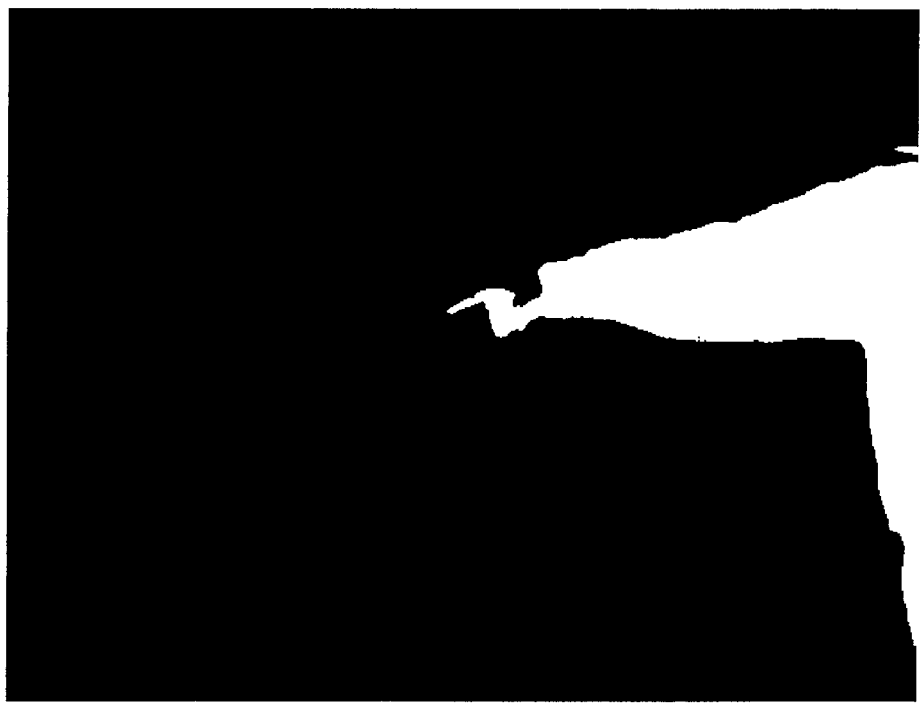
FIGS. 6(A) and 6(B) show an example of a captured image and its low resolution image when the presenter uses his hand to indicate the position he wants to indicate.
Figure 6B:
Figure 7A:
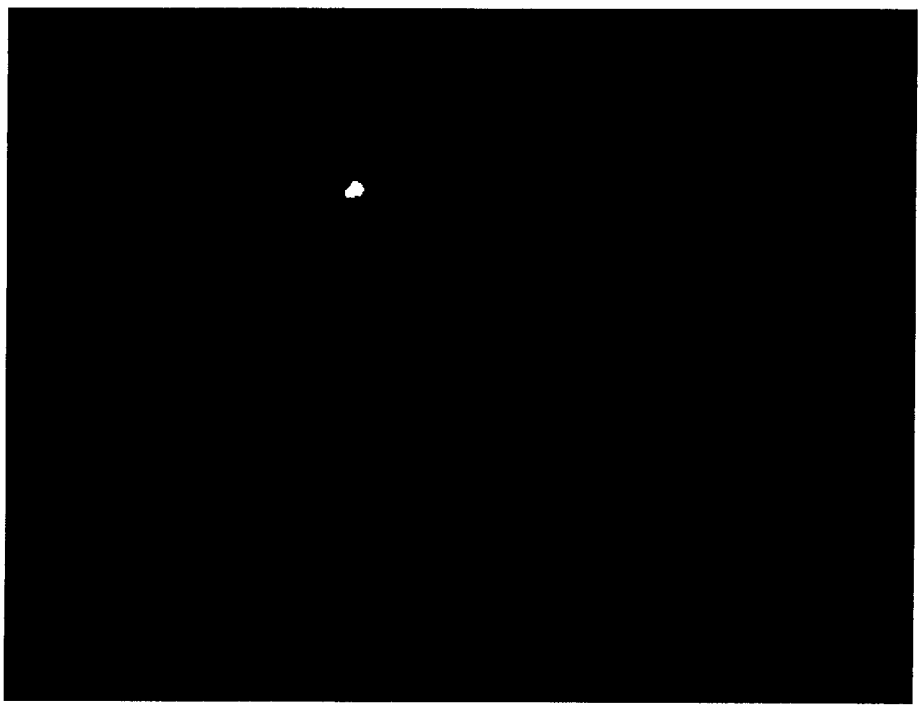
FIGS. 7(A) and 7(B) show an example of a captured image and its low resolution image when the presenter uses a laser pointer to indicate the position he wants to indicate.
Figure 7B:
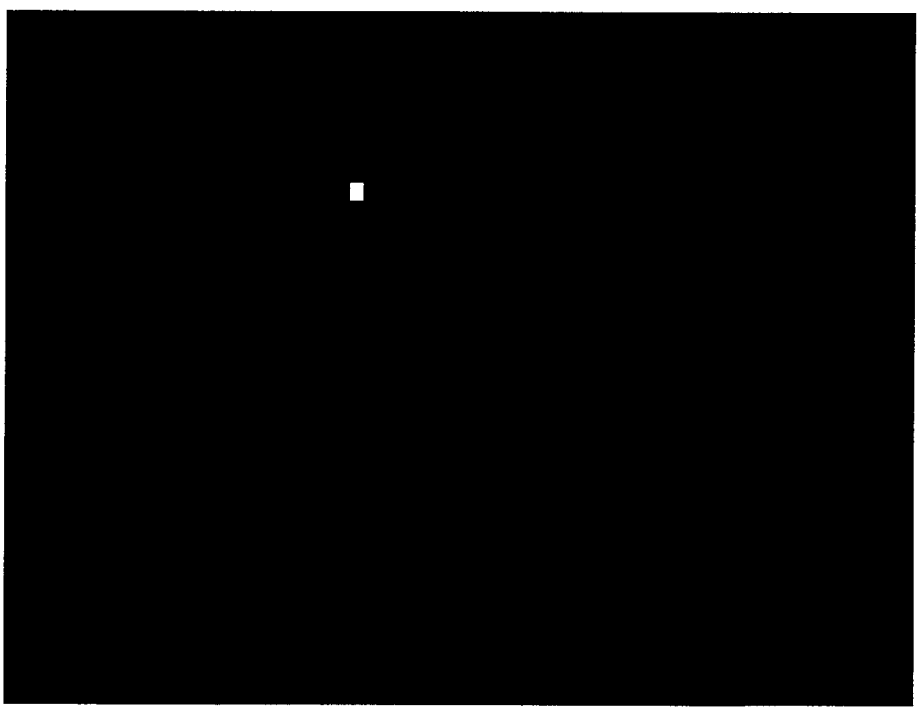

FIGS. 6(A) and 6(B) show an example of a captured image and its low resolution image when the indicated position is indicated by the presenter's hand. FIGS. 7(A) and 7(B) show an example of a captured image and its low resolution image when the indicated position is indicated by a laser pointer. The captured images shown in FIGS. 6(A) and 7(A) have a resolution of 1024×768 pixels, while the low resolution images shown in FIGS. 6(B) and 7(B) have a resolution of 32×24 pixels. In other words, one pixel in the low resolution image corresponds to 32×32 pixels in the captured image.

Figure 8A:
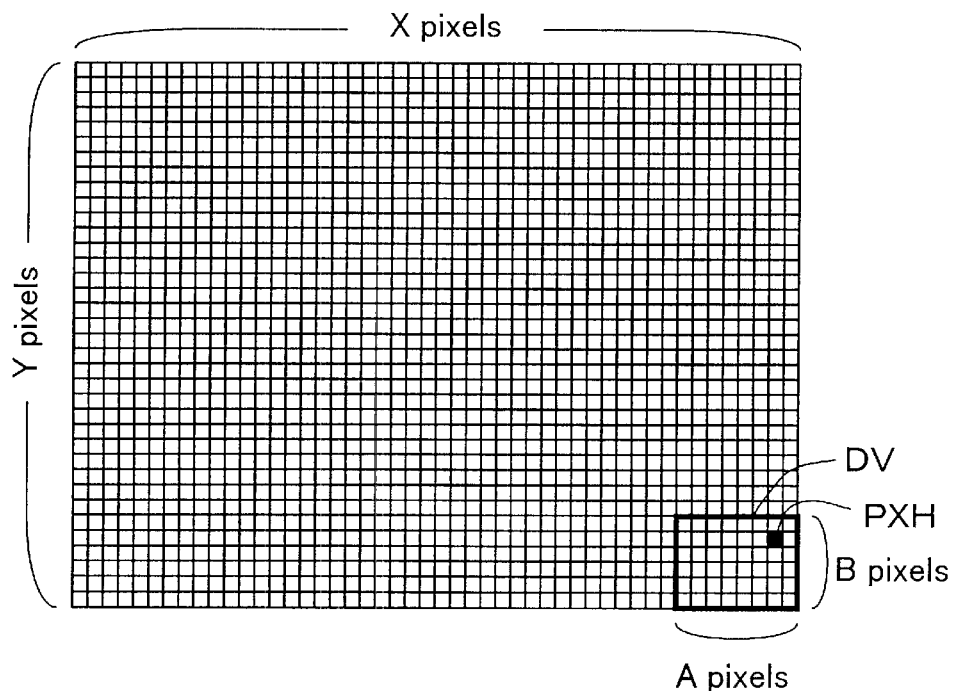
FIGS. 8(A) and 8(B) show a generalized relationship between a high resolution image and a low resolution image.
Figure 8B:
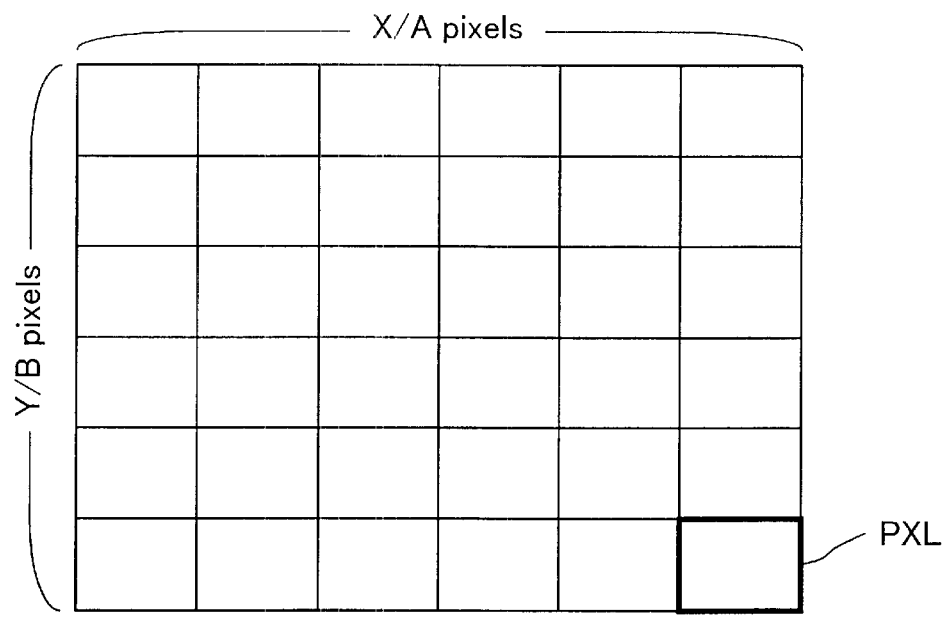

FIGS. 8(A) and 8(B) show a generalized relationship between a high resolution image and low resolution image. The high resolution image has a resolution of X×Y pixels where X and Y are integers of 1 or greater, and X≧Y. The low resolution image has a resolution of (X/A)×(Y/B) pixels where A is a divisor of X, and B is a divisor of Y. At this time, one unit area DV that includes A×B number of pixels PXH of the high resolution image corresponds to one pixel PXL within the low resolution image. The pixel PXH will be hereinafter referred to as "high resolution pixel", and the pixel PXL as "low resolution pixel."

Next, at step S340 in FIG. 4, a judgment is made of whether a mode of the indicated position detection is a luminescent spot detection mode or differential detection mode. When the differential detection mode is selected, tip position detection processing is performed at step S360. When the luminescence point detection mode is selected, on the other hand, luminescence position detection processing is performed at step S380. Note that luminescence point detection mode is selected when a light emitting type index tool such as a laser pointer is used. The differential detection mode is selected when using a non-light emitting type index tool such as a fescue or finger.

Figure 9:
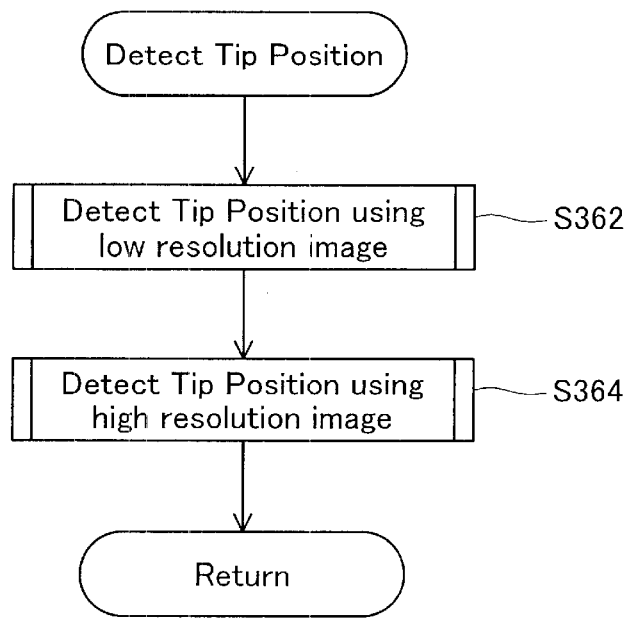
FIG. 9 is a flow chart showing the process of detecting the tip position at step S360 in FIG. 4.

FIG. 9 is a flow chart of the tip position detection processing at step S360 in FIG. 4. At step S362, a low resolution pixel PXL in which the tip position resides in the low resolution image (FIG. 8(B)) is determined. Then, at step S364, a high resolution pixel PXH within the unit area DV of the captured image corresponding to the low resolution pixel PXL detected at step S362 is determined. The tip position detection at steps S362 and S364 can be performed through various processing, for example, by obtaining a difference of a first image with the index tool image portion and a second image without the index tool image portion and by detecting the tip position in the difference image. However, since the low resolution image has a lower resolution than the captured image, the low resolution pixel of the tip position detected in the low resolution image could be outside a correct unit area DV including the actual tip position in the captured high resolution image. It is therefore preferable to perform detection processing at step S364 for the partitioned areas that correspond to the low resolution pixel of the tip position detected at step S362 and its adjacent low resolution pixels.

Figure 10:
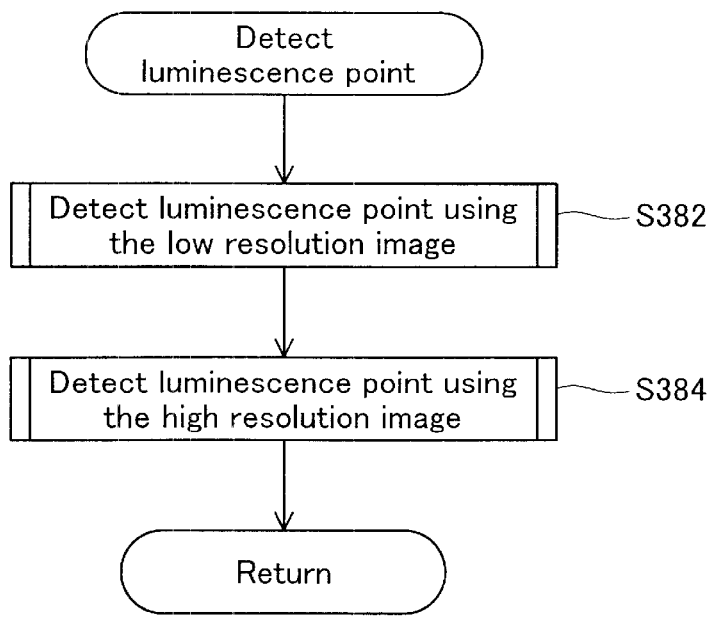
FIG. 10 is a flow chart showing the process of detecting the luminescence point at step S380 in FIG. 4.

FIG. 10 is a flow chart that shows the luminescence position detection processing at step S380 in FIG. 4. At step S382, luminescence point detection is performed for the low resolution image. Then, at step S384, luminescence point detection is performed for the captured high resolution image corresponding to the luminescence point detected at step S382. The luminescence point detection of steps S382 and S384 can be performed through various processing, for example, by binarizing an image with a predetermined threshold value and detecting a position surrounded by the greatest number of ON pixels, or by searching for the most bright pixel within the image. However, when the brightness of the luminescence point is not so high, the luminance point can be detected by obtaining a difference of a first image with the index tool image portion and a second image without the index tool image portion and by detecting the tip position in the difference image, as with the tip position detection. Also, when the luminescence point extends over multiple pixels, it is acceptable to perform detection of the luminescence point by finding the center of gravity of the luminescence point area.

The coordinates of the indicated position detected at step S360 or S380 of FIG. 4 as described above are supplied to, for example, the application program 210 at step S400.

The method shown in FIGS. 9 and 10 will be hereinafter referred to as "multiple resolution analysis"; in the multiple resolution analysis, a target position, that is, a tip position or luminescence point, is first detected within a low resolution image and then the detailed position is detected in a high resolution image corresponding to the detected position in the low resolution image.

Figure 11:
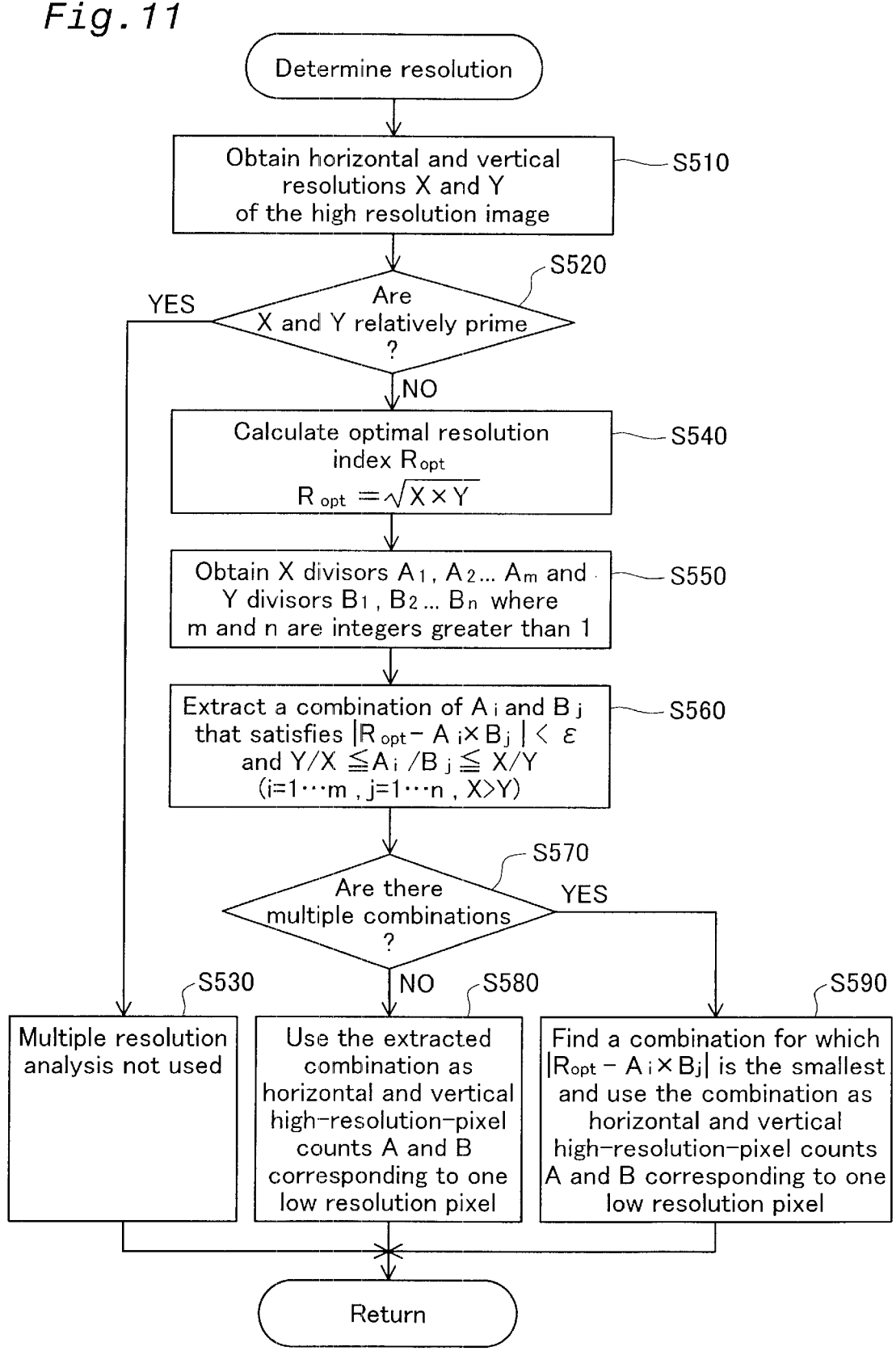
FIG. 11 is a flow chart showing the process of determining the resolution of the low resolution image at step S200 in FIG. 3.

C. Resolution Determining Process:

FIG. 11 is a flow chart showing the process of determining a resolution of the low resolution image at step S200 in FIG. 3. First, at step S510, the horizontal resolution X and vertical resolution Y of the captured high resolution image are obtained at step S510. The horizontal resolution X denotes a number of pixels on one horizontal scanning line, and the vertical resolution Y denotes a number of scanning lines in the image. The resolution values X and Y are determined from a resolution of the camera CM or from a resolution of the image that can be displayed by the projector PJ or display unit 150. The resolution values X and Y are input in advance during calibration at step S100 in FIG. 3. Alternatively, they can be input at step S510 in FIG. 1.

At step S520, a judgment is made of whether X and Y are relatively prime. If X and Y are relatively prime, it is not possible to produce a low resolution image, so it is determined that multiple resolution analysis is not performed at step S530 and the procedure of FIG. 11 is completed.

If X and Y are not relatively prime, on the other hand, an optimal resolution index $R_{opt}$ is calculated using Equation (4) below at step S540.

$$R_{opt} = \sqrt{X \times Y} \tag{4}$$

The optimal resolution index $R_{opt}$ has the following meaning. As explained with FIGS. 8 and 9, in the multiple resolution analysis, first, processing is performed to find a low resolution pixel PXL that includes a specific position for the low resolution image, and next processing is performed to find a high resolution pixel PXH for that specific position within a unit area DV within the high resolution image that is associated with that low resolution pixel PXL. With the process of finding the pixel position within the low resolution image, in the worst case scenario, it becomes necessary to check all of the X/A×Y/B number of pixels within the low resolution image. Similarly, with the process of finding the pixel position within one unit area DV within the high resolution image, it becomes necessary to check all the A×B number of pixels. If we assume this kind of worst case scenario, the worst case value f of the number of pixels to be checked in the multiple resolution analysis (hereinafter referred to as "worst case reference pixel count") is expressed by Equation (5) below.

$$f = \frac{X \times Y}{A \times B} + A \times B \tag{5}$$

Here, when A×B in Equation (5) is substituted with variable C, the following Equation (6) is obtained.

$$f = \frac{X \times Y}{C} + C \tag{6}$$

Figure 12:
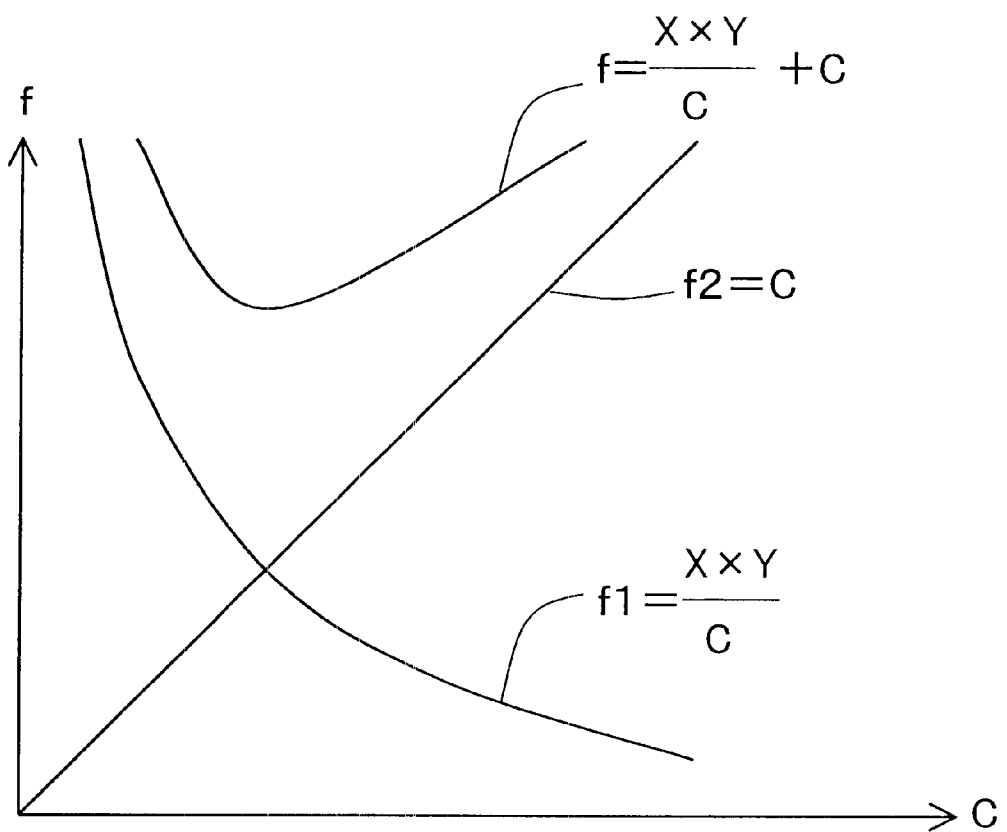
FIG. 12 is a graph showing the relationship between a worst case reference pixel count f and variable c given by Equation (6).

FIG. 12 is a graph that shows the relationship between the worst case reference pixel count f given by Equation (6) and variable C. Worst case reference pixel count f is a sum of the first term f1=(X×Y)/C at the right-hand side of Equation (6) and the second term f2=C. The curve of f shown in FIG. 12 is convex with a bottom. Therefore, the worst case reference pixel count f is at its minimum when the differential value of the worst case reference pixel count f by C is 0.

$$f' = \frac{X \times Y}{C^2} + 1 = 0 \tag{7}$$

Equation (8) is obtained by solving Equation (7).

$$C = A \times B = \sqrt{X \times Y} \tag{8}$$

Therefore, we can see that the optimal resolution index $R_{opt}$ represents the number A×B of high resolution pixels corresponding to one low resolution pixel when the worst case reference pixel count f is at its minimum.

At step S550, divisors $A_1 \ldots A_m$ of X and divisors $B_1 \ldots B_n$ of Y are obtained where m and n are integers each greater than 1. At step S560, a combination of $A_i$ (i=1 . . . m) and $B_j$ (j=1 . . . n) that satisfies both of Equations (9) and (10) below are found.

$$|R_{opt} - A_i \times B_j| = \epsilon \tag{9}$$

$$\frac{Y}{X} \leq \frac{A_i}{B_j} \leq \frac{X}{Y} \tag{10}$$

where $\epsilon$ is a predetermined threshold value.

Equation (9) means the condition for finding a combination of $A_i$ and $B_j$ that would make the difference between the optimal resolution index $R_{opt}$ and the product of $A_i$ and $B_j$ as small as possible. In this embodiment, $\epsilon=200$. The value of $\epsilon$ may be changed according to a resolution of the captured image.

Some combinations of $A_i$ and $B_j$ may greatly change an aspect ratio of the image in generating the low resolution image. However, such combinations are not preferable because they may cause problems such as degradation of image quality. Thus, Equation (10) defines a preferable range for the combinations of $A_i$ and $B_j$. It is not necessary to restrict the range of the combinations according to Equation (10), but it is also possible to use other conditions, such as Equation (11) below.

$$0.5 \leq \frac{A_i}{B_j} \leq 1.5 \tag{11}$$

At step S570, a judgment is made of whether there are multiple combinations of $A_i$ and $B_j$ extracted at step S560. When there is only one combination of $A_i$ and $B_j$, the extracted combination is adopted as the horizontal and vertical pixel counts A and B of the unit area DV corresponding to one low resolution pixel PXL at step S580.

When there are multiple combinations of $A_i$ and $B_j$, the horizontal and vertical pixel counts A and B of the unit area DV corresponding to one low resolution pixel PXL are determined to be the combination for which the value of $|R_{opt} - A_i \times B_j|$ is the smallest at step S590.

The horizontal and vertical resolutions (X/A) and (Y/B) of the low resolution image are determined from the pixel counts A and B thus determined.

The number, A×B, of high resolution pixels that corresponds to one low resolution pixel PXL is determined to be as close a value to the optimal resolution index $R_{opt}$ as possible by means of the conditions at steps S560 and S590. As described above, the optimal resolution index $R_{opt}$ represents the number, A×B, of high resolution pixels PXH corresponding to one low resolution pixel PXL when the worst case reference pixel count f is at its minimum. Therefore, the above process of determining resolution of the low resolution image determines the pixel counts A and B so that the worst case reference pixel count f is at its minimum.

FIG. 13 shows examples of the resolution of the low resolution image determined according to the process of FIG. 11.

The resolution of the low resolution image is determined so that the worst case reference pixel count f is at its minimum in the multiple resolution analysis. Therefore, if the multiple resolution analysis is performed using a low resolution image having a resolution determined in this way, it is possible to detect the indicated position at a higher speed than in the procedure which uses only the captured high resolution images. Moreover, since the actual indicated position detection is performed using a captured high resolution image, it is possible to attain high precision detection.

Furthermore, since the optimal resolution of the low resolution image is determined on the basis of the resolution of the captured high resolution image, the optimal high speed and high precision detection can be attained according to the resolution of the captured image.

In the above process of determining the resolution of the low resolution image, the number, A×B, of high resolution pixels corresponding to one low resolution pixel PXL is determined while assuming that A and B are different values, but it is also possible to use a common value for A and B, which is a common divisor of X and Y, to execute the process of determining the resolution shown in FIG. 11. This will make the low resolution pixel PXL to have a square shape, which is preferable in the image processing.

D. Other Resolution Determining Processes:

In the following process, A×A number of the high resolution pixels correspond to one low resolution pixel PXL. In other words, the low resolution pixel PXL has a square shape.

Figure 14:
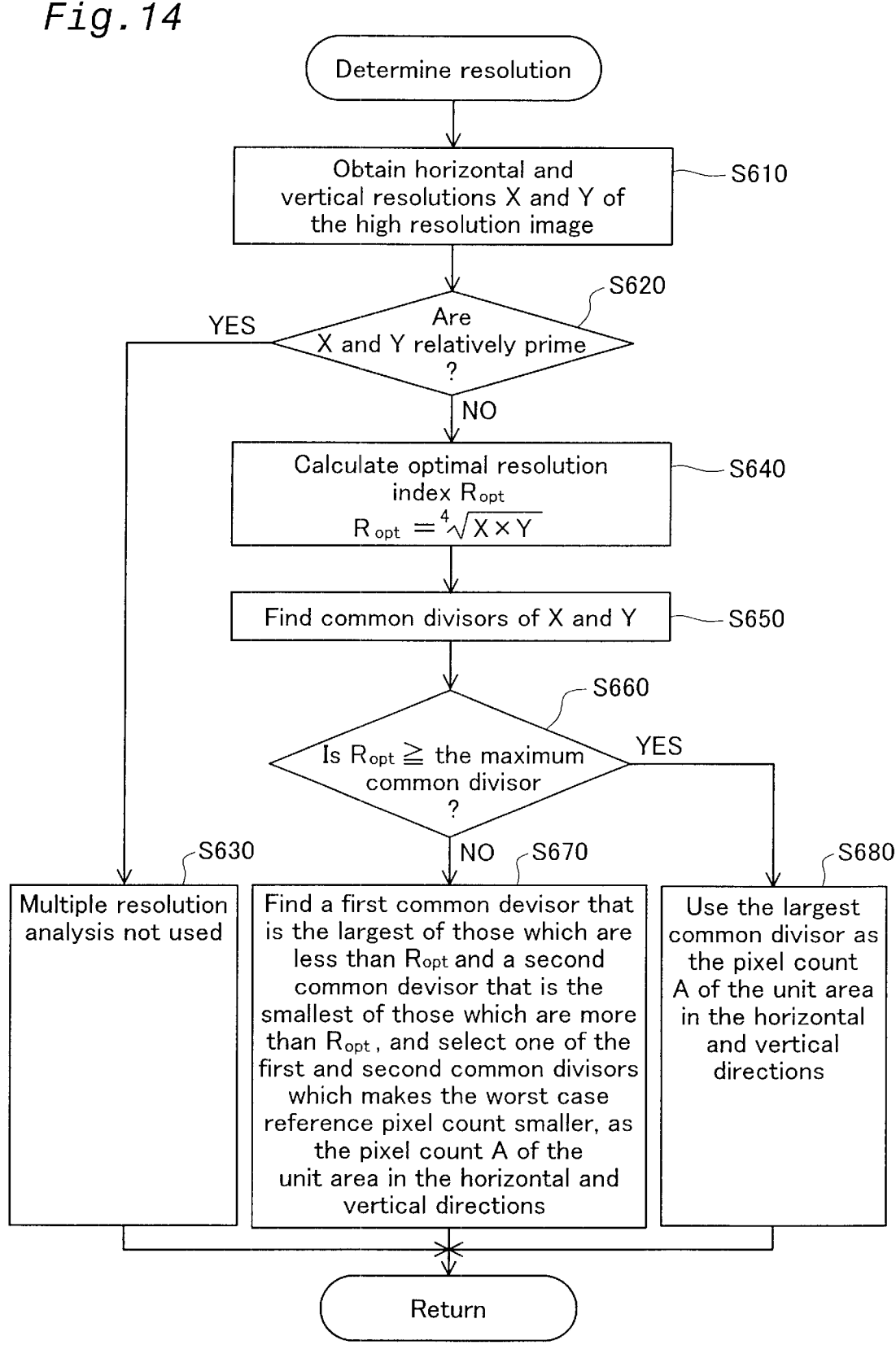
FIG. 14 is another flow chart showing the process of determining the resolution of the low resolution image at step S200 in FIG. 3.

FIG. 14 is a flow chart that shows another process of determining the resolution of a low resolution image at step S200 in FIG. 3. Steps S610 to 630 are the same as steps S510 to 530 in FIG. 11, so their explanation is omitted here.

At step S640, as with step S540 in FIG. 11, optimal resolution index $R_{opt}$ is found by Equation (12) below.

$$R_{opt} = \sqrt[4]{X \times Y} \quad (12)$$

This optimal resolution index $R_{opt}$ has the following meaning. As with Equation (5) noted above, the worst case reference pixel count f in the multiple resolution analysis is expressed by the sum of the number of pixels X/A×Y/A within the low resolution image and the number A×A of high resolution pixels corresponding to one low resolution pixel PXL, as given by Equation (13) below.

$$f = \frac{X \times Y}{A^2} + A^2 \quad (13)$$

The graph that shows the relationship between the reference pixel count f given by Equation (13) and the variable A is a curve that is convex having a bottom as with Equation (5) noted above. Therefore, the worst case reference pixel count f is at its minimum when the differential value of the worst case reference pixel count f is 0.

$$f' = -\frac{2X \times Y}{A^3} + 2A = 0 \quad (14)$$

Equation (15) is obtained by solving Equation (14).

$$A = \sqrt[4]{X \times Y} \quad (15)$$

Therefore, the optimal resolution index $R_{opt}$ represents the condition for which the worst case reference pixel count f is at its minimum.

At step S650, the common divisor of X and Y is found. At step S660, a judgment is made of whether the largest of the common divisors obtained at step S650 is greater than the optimal resolution index $R_{opt}$. When the value of the maximum common divisor is less than the optimal resolution index $R_{opt}$, the maximum common divisor is adopted as the pixel count A of the unit area both in horizontal and vertical directions at step S680.

When the maximum common divisor is greater than the optimal resolution index $R_{opt}$, the process at step S670 finds a first common devisor that is the largest of those which are less than $R_{opt}$ and a second common devisor that is the smallest of those which are more than $R_{opt}$, and selects one of the first and second common divisors which makes the worst case reference pixel count f given by Equation (15) smaller. The selected common divisor is used as the pixel count A of the unit area in the horizontal and vertical directions.

Horizontal and vertical resolutions X/A and Y/A of the low resolution image are determined from the pixel count A thus determined.

FIG. 15 shows examples of the resolution of the low resolution image determined according to the process of FIG. 14.

In the above embodiments, the resolution of the low resolution image is determined so that the worst case reference pixel count f is at its minimum in the multiple resolution analysis. Accordingly, the multiple resolution analysis using a low resolution image of a resolution thus determined can detect the indicated position faster than in the case which uses only the captured high resolution image.

The above embodiments are directed to detection of an indicated position on an image displayed by a projector, but the present invention is also applicable to detection of an indicated position on an image displayed by other types of display devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting an indicated position on a display screen that is indicated by a user, comprising the steps of:
    (a) capturing an image of the display screen that includes the indicated position, the captured image including a plurality of high resolution pixels;
    (b) producing a low resolution image with lower resolution than the captured image based on the captured image, the low resolution image including a plurality of low resolution pixels, each low resolution pixel being associated with a unit area within the captured image, the unit area including a predetermined number of high resolution pixels;
    (c) finding a low resolution pixel corresponding to the indicated position within the low resolution image; and
    (d) finding the indicated position within the captured image based on a unit area that is associated with the low resolution pixel corresponding to the indicated position,
    wherein a resolution of the low resolution image is determined by finding integers A and B so that a value f given by Equation (1) is at a minimum:

$$f = \frac{X \times Y}{A \times B} + A \times B \quad (1)$$

where X denotes a number of high resolution pixels of the captured image in a horizontal direction, Y denotes a number of high resolution pixels of the captured image in a vertical direction, and A denotes a number of high resolution pixels of the unit area in the horizontal direction, A being a divisor of X, and B denotes a number of high resolution pixels of the unit area in the vertical direction, B being a divisor of Y.

2. A method in accordance with claim 1, wherein the resolution of the low resolution image is determined by finding the integers A and B from among combinations of integers Ai and Bj satisfying Equation (2):

$$0.5 \leq \frac{A_i}{B_j} \leq 1.5 \quad (2)$$

where Ai are divisors of X and Bj are divisors of Y.

3. A method in accordance with claim 1, wherein the resolution of the low resolution image is determined by finding the integers A and B from among combinations of integers Ai and Bj satisfying Equation (3):

$$\frac{Y}{X} \leq \frac{A_i}{B_j} \leq \frac{X}{Y} \quad (3)$$

where Ai are divisors of X and Bj are divisors of Y.

4. A method in accordance with claim 1, wherein the resolution of the low resolution image is determined by finding the integers A and B from among combinations of integers Ai and Bj which are equal to each other where Ai are divisors of X and Bj are divisors of Y.

5. An apparatus for detecting an indicated position on a display screen that is indicated by a user, comprising:

an image capture section configured to capture an image of the display screen that includes the indicated position, the captured image including a plurality of high resolution pixels;

a low resolution image production section configured to produce a low resolution image with lower resolution than the captured image based on the captured image, the low resolution image including a plurality of low resolution pixels, each low resolution pixel being associated with a unit area within the captured image, the unit area including a predetermined number of high resolution pixels;

a position detection section configured to find a low resolution pixel corresponding to the indicated position within the low resolution image; and to find the indicated position within the captured image based on a unit area that is associated with the low resolution pixel corresponding to the indicated position; and a resolution determining section configured to determine a resolution of the low resolution image by finding integers A and B so that a value f given by Equation (1) is at a minimum:

$$f = \frac{X \times Y}{A \times B} + A \times B \quad (1)$$

where X denotes a number of high resolution pixels of the captured image in a horizontal direction, Y denotes a number of high resolution pixels of the captured image in a vertical direction, and A denotes a number of high resolution pixels of the unit area in the horizontal direction, A being a divisor of X, and B denotes a number of high resolution pixels of the unit area in the vertical direction, B being a divisor of Y.

6. An apparatus in accordance with claim 5, wherein the resolution of the low resolution image is determined by finding the integers A and B from among combinations of integers Ai and Bj satisfying Equation (2):

$$0.5 \leq \frac{A_i}{B_j} \leq 1.5 \quad (2)$$

where Ai are divisors of X and Bj are divisors of Y.

7. An apparatus in accordance with claim 5, wherein the resolution of the low resolution image is determined by finding the integers A and B from among combinations of integers Ai and Bj satisfying Equation (3):

$$\frac{Y}{X} \leq \frac{A_i}{B_j} \leq \frac{X}{Y} \quad (3)$$

where Ai are divisors of X and Bj are divisors of Y.

8. An apparatus in accordance with claim 5, wherein the resolution of the low resolution image is determined by finding the integers A and B from among combinations of integers Ai and Bj which are equal to each other where Ai are divisors of X and Bj are divisors of Y.

9. A computer program product for detecting an indicated position on a display screen that is indicated by a user, the computer program product comprising:

a computer readable medium; and a computer program stored on the computer readable medium, the computer program comprising:

a first program for causing a computer to capture an image of the display screen that includes the indicated position, the captured image including a plurality of high resolution pixels;

a second program for causing the computer to produce a low resolution image with lower resolution than the captured image based on the captured image, the low resolution image including a plurality of low resolution pixels, each low resolution pixel being associated with a unit area within the captured image, the unit area including a predetermined number of high resolution pixels;

a third program for causing the computer to find a low resolution pixel corresponding to the indicated position within the low resolution image; and to find the indicated position within the captured image based on a unit area that is associated with the low resolution pixel corresponding to the indicated position; and a fourth program for causing the computer to determine a resolution of the low resolution image by finding integers A and B so that a value f given by Equation (1) is at a minimum:

$$f = \frac{X \times Y}{A \times B} + A \times B \tag{1}$$

where X denotes a number of high resolution pixels of the captured image in a horizontal direction, Y denotes a number of high resolution pixels of the captured image in a vertical direction, and A denotes a number of high resolution pixels of the unit area in the horizontal direction, A being a divisor of X, and B denotes a number of high resolution pixels of the unit area in the vertical direction, B being a divisor of Y.

10. A computer program product in accordance with claim 9, wherein the resolution of the low resolution image is determined by finding the integers A and B from among combinations of integers Ai and Bj satisfying Equation (2):

$$0.5 \leq \frac{A_i}{B_j} \leq 1.5 \tag{2}$$

where Ai are divisors of X and Bj are divisors of Y.

11. A computer program product in accordance with claim 9, wherein the resolution of the low resolution image is determined by finding the integers A and B from among combinations of integers Ai and Bj satisfying Equation (3):

$$\frac{Y}{X} \leq \frac{A_i}{B_j} \leq \frac{X}{Y} \tag{3}$$

where Ai are divisors of X and Bj are divisors of Y.

12. A computer program product in accordance with claim 9, wherein the resolution of the low resolution image is determined by finding the integers A and B from among combinations of integers Ai and Bj which are equal to each other where Ai are divisors of X and Bj are divisors of Y.

* * * * *